United States Patent [19]

Dougherty

[11] Patent Number: 4,914,957
[45] Date of Patent: Apr. 10, 1990

[54] LEAK TEST ADAPTOR APPARATUS FOR FACILITATING LEAK TESTING FACE MASK RESPIRATORS

[75] Inventor: William Dougherty, Glassboro, N.J.

[73] Assignee: Westinghouse Electric Corp., Pittsburgh, Pa.

[21] Appl. No.: 372,147

[22] Filed: Jun. 26, 1989

Related U.S. Application Data

[63] Continuation of Ser. No. 182,276, Apr. 15, 1988, abandoned.

[51] Int. Cl.$^4$ .............................................. G01M 3/04
[52] U.S. Cl. ........................................................ 73/40
[58] Field of Search ................ 73/40, 40.5, 40.7, 45.5, 73/863.23, 863.71, 863.81, 863.86, 864.81; 128/206.15, 206.17, 207.12; 55/270, DIG. 33

[56] References Cited

U.S. PATENT DOCUMENTS

| | | | |
|---|---|---|---|
| 1,789,262 | 1/1931 | Monro et al. ................... | 128/206.15 |
| 2,420,372 | 5/1947 | Heidbrink . | |
| 2,449,053 | 9/1948 | Burns et al. . | |
| 2,738,669 | 3/1956 | Silverman et al. . | |
| 2,744,524 | 5/1956 | Whipple .......................... | 128/206.15 |
| 3,486,366 | 12/1969 | Jackson . | |
| 3,580,051 | 5/1971 | Blevins ................................... | 73/40 |
| 4,146,025 | 3/1979 | Warncke et al. ........................ | 73/40 |
| 4,253,328 | 3/1981 | Pasternack . | |
| 4,453,544 | 6/1984 | Silverthorn ..................... | 128/206.15 |
| 4,456,014 | 6/1984 | Buck et al. ......................... | 73/863.86 |
| 4,543,112 | 9/1985 | Ackley et al. ................... | 128/206.15 |
| 4,846,166 | 7/1989 | Willeke .................................... | 73/46 |

FOREIGN PATENT DOCUMENTS

| | | | |
|---|---|---|---|
| 705843 | 4/1941 | Fed. Rep. of Germany .......... | 73/40 |
| 763363 | 4/1934 | France ............................. | 128/206.15 |

OTHER PUBLICATIONS

Exhibit 1: Photocopy of advertisement disclosing a QUANTAFIT workstation fit test instrument marketed by Dynatech Frontier Corporation. Title and date of publication containing the advertisement are unknown to applicant.
Exhibit 2: Photocopy of two pages (i.e., cover page and p. 4) from Industrial Hygiene News, Mar. 1986, vol. 9, No. 2.
Exibit 3: Photocopy of two pages (i.e., cover page and p. 26) from Occupational Health & Safety, Aug. 1982.
Exhibit 4: Photocopy of two pages (i.e., cover page and another page) from Occupational Health & Safety, Jul. 1981.

Primary Examiner—Robert R. Raevis
Attorney, Agent, or Firm—Walter S. Stevens

[57] ABSTRACT

Leak test adaptor apparatus for facilitating leak testing face mask respirators including an outer member having a bore therethrough, the bore having a first end and a second end; an inner member disposed in the bore of the outer member, the inner member having a channel therethrough defining a flow path for passage of the gas through the channel from the first end to the second end of the bore; a pressure responsive valve connected to the inner member for regulating the flow of the gas through the channel; and a gas sampling port in communication with the bore for sampling the gas in the bore. The pressure responsive valve closes the channel when the gas pressure near the second end of the bore is greater than the gas pressure near in the channel and opens the channel when the gas pressure nearer the second end of the bore is less than the gas pressure in the channel. The pressure-responsive valve, which is disposed in the flow path of the gas, includes a valve seat connected to the inner member, a valve shaft connected to the valve seat, and a substantially thin disk-shaped gate member slidable connected to the valve shaft, which gate member is capable of closing and opening the channel by sliding along the valve shaft when acted upon by the difference in gas pressure between the channel and the second end of the bore.

23 Claims, 6 Drawing Sheets

LEAK TEST ADAPTOR APPARATUS FOR FACILITATING LEAK TESTING FACE MASK RESPIRATORS

This application is a continuation of application Ser. No. 07/182,276 filed Apr. 15, 1988, now abandoned.

This invention relates generally to leak test apparatus for respirators and relates more particularly to a leak test adaptor apparatus having pressure-responsive gas flow regulating means and a gas sampling port for facilitating leak testing face mask respirators.

A respirator is a device which covers at least the nose and/or mouth of a human or animal subject for preventing the inhalation of noxious substances such as smoke, dust or the like so that the respiratory tract organs of the subject are not injured by the noxious substances. Typically, the respirator prevents the inhalation of the noxious substances during respiration by filtering-out these substances through a filter having a predetermined composition. It is well known that respiration itself is the act or process of inspiration and expiration. Inspiration consists of inhaling air into the lungs for oxygenating and purifying the blood, while expiration consists of exhaling waste gases from the lungs following inspiration. Of course, continued and repeated inspiration and expiration constitutes breathing. Therefore, a face mask respirator is a respirator worn on the face of the wearer for filtering-out noxious substances during the act of breathing so that the respiratory tract organs of the wearer are protected from injury.

It is highly desirable that the respirator operate as intended so that the respiratory tract of the wearer is protected from inspiration of the noxious substances. Hence, to ensure that the respirator operates as intended, the respirator is periodically tested for leaks and for proper fit when worn by the wearer. In the case of a face mask respirator, the face mask respirator is tested to ensure that it is free of leaks and fits the face of the wearer in a substantially seal-tight relation so that the only path for air flow into the face mask portion of the respirator is through the filter portion of the respirator and not around the edges of the face mask where the face mask portion meets the face of the wearer (i.e., tightness of fit testing). Typically, which is tightness of fit testing, also commonly referred to as face fit testing or respirator fit testing, is conducted by placing a test subject in a gas or particulate aerosol chamber having an atmosphere containing a predetermined quantity of an irritant smoke, gas and/or particulate aerosol such as ammonia, vinyl bromomethane and ethanoic acid ether, dioctylpthalate (dop), corn oil or the like.

In one type of testing, commonly referred to as qualitative testing, the respirator is determined to have a sufficiently tight fit on the face of the test subject if the test subject cannot detect the odor of the irritant gas and/or particulate aerosol. In another type of tightness of fit testing, commonly referred to as quantitative testing, the atmosphere inside the face mask is sampled and analyzed for the presence of the gas and/or particulate aerosol.

In typical industrial practice, a face mask respirator is assigned to the wearer so that it becomes the wearer's personal face mask respirator. However, prior to permanently assigning a personal face mask respirator to the wearer, it is necessary to determine whether the wearer can be properly fitted with a respirator by conducting, for example the quantitative tightness of fit test referred to hereinabove. Moreover, if the wearer has already been assigned a personal face mask respirator, it may be necessary to determine whether the respirator continues to properly fit the wearer. Typically, the quantitative tightness of fit test is conducted using a probed common face mask respirator which may have been worn by previous test subjects. This type of face mask is probed in the sense that it has a sampling probe inserted through the face mask for.. sampling the atmosphere within the face mask. Although insertion of the sampling probe through the face mask obtains a face mask respirator usable for tightness of fit testing, insertion of the sampling probe through the face mask also results in a face mask respirator that is unusable in the field because once probed, the open sampling probe will admit noxious substances into the face mask. Moreover, the use of a common face mask respirator, which may have been worn by previous test subjects, may expose the test subject to increased risk of contracting communicable and infectious diseases. Thus, although tightness of fit testing for face mask respirators may determine whether the respirator can properly fit the wearer for decreasing the risk of injury to the wearer's respiratory tract, the use of a common face mask respirator worn by previous test subjects may actually increase the risk to the current test subject of contracting communicable and infectious diseases. Therefore, a problem in the art has been to provide an apparatus capable of adapting the wearer's personal face mask respirator for use during the tightness of fit test so that the need for using a common respirator is precluded and so that the risk to the wearer of contracting communicable and infectious diseases is therefore avoided. Another problem in the art has been to provide an apparatus capable of adapting the wearer's personal face mask respirator for use during the tightness of fit test so that the need for inserting a sampling probe into the face mask is avoided in order that the face mask respirator is usable in the field after the tightness of fit test is completed.

A method for leak testing masks is disclosed in U.S. Pat. No. 3,580,051 entitled "Method for Leak Testing Masks" issued May 25, 1971 to William V. Blevins and assigned to the United States of America. This patent discloses a method of leak testing masks by means of a respiratory air flow measuring device designed for the purpose of measuring the pressure drop inside of a protective mask while the mask is being worn. However, this patent does not appear to disclose a leak test adaptor apparatus for facilitating leak testing a face mask respirator as described and claimed herein.

A device for testing the tightness of fit of gas masks is described in U.S. Pat. No. 4,146,025 entitled "Device for Testing the Tightness of Fit of Gas Masks" issued Mar. 27, 1979 in the name of Ernst Warncke et al. and assigned to Dragerwerk Aktiegesellschaft, Federal Republic of Germany. The Warncke et al. device comprises a headpiece which is filled with a test gas and includes an exhalation air connection to be coupled to an exhalation valve of the gas mask. This device, which uses a known test tube process generally recognized for gas measuring, permits a tightness test of the gas mask on the wearer. An object of this invention is to provide a device for testing the tightness of a gas mask which includes means for applying a testing gas without interfering with the respiratory air inlet passage to the gas mask and for separately discharging the respiratory air from the gas mask so that it may be collected to measure the proportion of testing gas it contains. However, the Warncke et al. device does not appear to provide a leak test adaptor apparatus having pressure-responsive gas flow regulating means and a gas sampling port for facilitating leak testing a face mask respirator as described and claimed herein.

Another device for testing masks is disclosed by U.S. Pat. No. 2,420,372 entitled "Leak Testing for Therapeutic Masks" issued May 13, 1947 in the name of Jay A. Heidbrink and assigned to Air Reduction Company. The Heidbrink invention is directed towards a leak tester of the expansion type, wherein a weighted bellows-like gas container will be held closed by normal air pressure unless gas is admitted through an opening connected with the mask upon the face of a wearer, in which case a weighted rubber member will expand, thus indicating that there is a leak about the gas mask as it is worn upon the face. However, the Heidbrink patent does not appear to disclose a leak test adaptor apparatus having pressure-responsive gas flow regulating means and a gas sampling port for facilitating leak testing a face mask respirator as described and claimed herein.

Therefore, although the above-recited patents may disclose leak testing devices for respirator masks, these patents do not appear to disclose an apparatus for testing the face fit of a face mask respirator as described and claimed herein.

Consequently, what is needed is a leak test adaptor apparatus having pressure-responsive gas flow regulating means and a gas sampling port for facilitating leak testing face mask respirators.

SUMMARY OF THE INVENTION

This invention provides a leak test adaptor apparatus having pressure-responsive gas flow regulating means and a gas sampling port for facilitating leak testing face mask respirators.

It is desirable that the face mask respirator fit the face of the wearer in a substantially seal-tight relation so that the respiratory tract organs of the wearer are not injured by inhalation of noxious substances such as dust, smoke or the like. In this regard, it is typical industrial practice to conduct a test, commonly referred to in the art as a tightness of fit test, to determine whether a face mask respirator can properly fit the face of the wearer. Usually, the tightness of fit test is conducted using a probed common face mask respirator which may have been worn by previous test subjects. After a face mask has been probed, it becomes unsuitable for use other than in tightness of fit testing. Moreover, the use of a common face mask respirator, which may have been worn by previous test subjects, can expose the test subject to increased risk of contracting communicable and infectious diseases. A problem in the art has been to provide an apparatus that allows the tightness of fit test to be conducted using the wearer's personal face mask respirator rather than using a probed common face mask respirator.

This invention relates to a leak test adaptor apparatus for facilitating leak testing a face mask respirator such that the wearer's personal face mask respirator can be adapted for use in the tightness of fit test. The adaptor apparatus is capable of being connected to the filter receptacle of the face mask portion of the wearer's personal face mask respirator for conducting the test. The invention comprises a generally cylindrical outer member having a bore therethrough, the bore having a first end disposed farther away from the face of the wearer and a second end disposed nearer the face of the wearer. Disposed in the bore of the outer member is a generally cylindrical inner member, the inner member having a channel therethrough defining a flow path for passage of a test gas a test articulate aerosol containing a detectable test substance such as ammonia, vinyl bromomethane and ethanoic acid ether, dioctylpthalate, corn oil or the like. Connected to the inner member is a gas flow regulating means disposed in the flow path of the test gas or aerosol for regulating the flow of gas or aerosol through the channel, which channel has an inlet opening and an outlet opening. The inner member is capable of receiving a particulate filter for filtering the test gas therethrough. The apparatus further comprises a sampling port formed through the outer member such that the sampling port is in communication with the bore for sampling the gas or particulate aerosol in the bore. The sampling port is in turn connected to a gas analysis unit for assisting in the collection and analysis of the test gas or particulate aerosol in the bore.

The gas flow regulating means referred to above is a pressure-responsive valve for opening the channel when the downstream gas or aerosol pressure is greater than the upstream gas or aerosol pressure and for closing the channel when the upstream gas or aerosol pressure is greater than the downstream gas or aerosol pressure. The upstream gas or aerosol pressure is defined to be that gas or aerosol pressure in the bore of the outer member near the second end of the bore and the downstream gas or aerosol pressure is defined to be the gas or aerosol pressure in the channel. According to the invention, the pressure-responsive valve includes a valve seat connected to the inner member and disposed in the channel outlet opening in the flow path of the gas or aerosol flowing from the channel. The valve seat may comprise a wire connected to the inner member and horizontally disposed in the flow path of the gas or aerosol. Alternatively, the valve seat may comprise a valve seat cylinder matingly disposed in the channel and having a plurality of longitudinal conduits therethrough for conducting the test gas or aerosol from the channel to the bore. A valve shaft extending outwardly from the valve seat has one end thereof connected to the valve seat and has the other end thereof terminating in a bulbous portion. A substantially thin and disk-shaped gate member, which is slidably connected to the valve shaft, is interposed between the valve seat and the bulbous portion. The gate member is capable of covering and uncovering the outlet opening of the channel for respectively closing and opening the channel by sliding along the valve shaft. The bulbous portion of the valve shaft prevents the gate member from sliding-off the valve shaft when the gate member slides along the valve shaft. The valve seat referred to above serves to support the valve shaft and to prevent the substantially thin gate member from folding and traveling into the channel so that the channel can be suitably covered and closed when the gate member slides along the valve shaft and contacts the valve seat.

During the tightness of fit test, the test subject will inhale and exhale while wearing the face mask respirator, which has the adaptor apparatus connected thereto. When the test subject inhales, the test gas or aerosol will be drawn through the particulate filter which will filter-out the test substance from the test gas. The gas or aerosol, thus filtered, will travel from the filter, through the channel and into the bore. During inhalation, the upstream gas or aerosol pressure is less than the downstream gas or aerosol pressure. This negative difference in gas or aerosol pressure across the gate member will act on the gate member and cause it to levitate and slide along the valve shaft such that the outlet opening is uncovered and the channel is opened. When the test subject exhales, the upstream gas or aerosol pressure acting on the gate member is greater than the downstream gas or aerosol pressure in the channel. This positive difference in gas or aerosol pressure across the gate member will act on the gate member and cause it to descend and to slide along the valve shaft such that the outlet opening of the channel is covered and the channel closed. When the gate member closes the channel, the only two paths for exit of the gas or aerosol during exhalation is through the sampling port and through an exhaust port which is attached to the face mask. As stated above, the gas or aerosol exiting through the sampling port is suitably collected and analyzed for presence of the test substance. Presence of the test substance in the gas or aerosol thus analyzed indicates that the test gas or aerosol has leaked into the face mask portion of the respirator and that the face mask portion of the respirator does not properly fit the face of the test subject.

Therefore, an object of the invention is to provide an apparatus for sampling a gas or aerosol comprising means for regulating the flow of the gas or aerosol through a channel formed in the apparatus.

Another object of the invention is to provide an apparatus for leak-testing a personal face mask respirator when worn on the face of the wearer comprising a pressure-responsive valve having a valve seat, a valve shaft connected to the valve seat, and a gate member slidably connected to the valve shaft, which gate member closes and opens the channel by a negative or positive difference in gas or aerosol pressure acting across the gate member.

Yet another object of the invention is to provide a valve-seat capable of supporting the valve shaft and also capable of preventing the gate member from folding and traveling into the channel so that the outlet opening of the channel can be suitably covered and closed.

Still another object of the invention is to provide an apparatus that allows the tightness of fit test to be conducted using the wearer's personal face mask respirator rather than using a probed common face mask respirator.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT

A face mask respirator is a respirator worn on the face of the wearer for filtering-out noxious substances during the act of breathing so that the respiratory tract organs of the wearer are protected from injury. To ensure that the respirator operates as intended, the face mask respirator is tested to ensure that it is leak-free and that it fits the face of the wearer in a substantially sealtight relation. This invention provides a leak test adaptor apparatus having pressure-responsive gas flow regulating means and a gas sampling port for facilitating leak testing face mask respirators.

Figure 1:
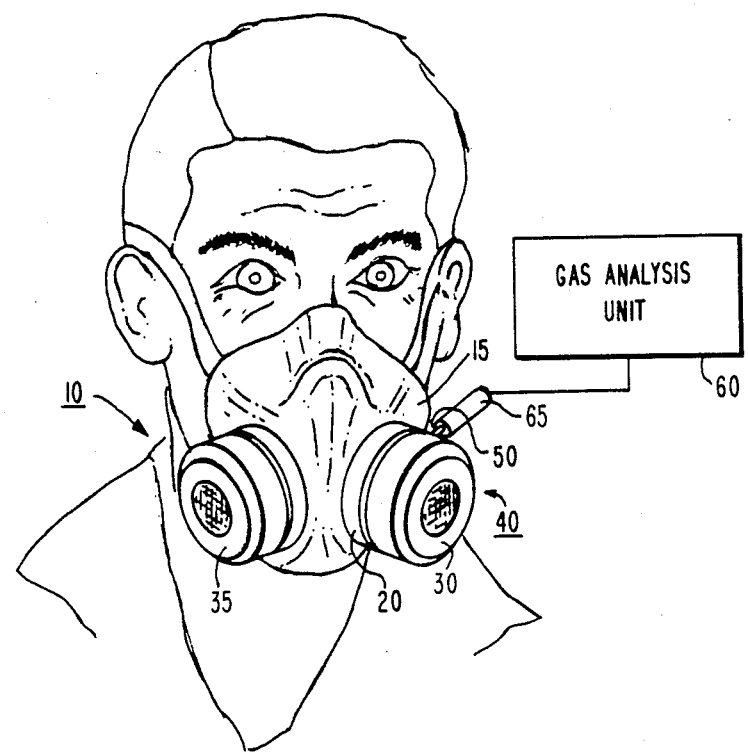
FIG. 1 is a perspective view of a face mask respirator worn on a face of the wearer, the having a leak test adaptor apparatus connected thereto.

Referring to FIG. 1, a face mask respirator, generally referred to as 10, is illustrated having a face mask portion 15 worn on the face of the wearer. Integrally connected to face mask portion 15 is at least one generally cylindrical face mask filter receptacle 20 capable of matingly sealingly receiving a generally cylindrical face mask respirator filter assembly 30 therein for filtering-out noxious substances during respiration. Also integrally connected to face mask portion 15 is at least one exhaust port 35 for providing an exit path for exhaled gas from face mask portion 15. Respirator 10 may be any suitable face mask respirator such as COMFO II available from Mine Safety Appliances located in Pittsburgh, Pa. Filter assembly 30 may be any appropriate filter assembly such as a MSA filter assembly available from Mine Safety Appliances. To perform tightness of fit testing, there is sealingly received in filter receptacle 20 a generally cylindrical leak test adaptor apparatus, generally referred to as 40, shown in FIG. 1 in operative condition for facilitating leak testing respirator 10. Integrally connected to adaptor apparatus 40 is a hollow sampling port 50, which may be generally cylindrical, for sampling the gas in adaptor apparatus 40. Sampling port 50 has a longitudinal obstruction-free passageway 140 therethrough for passage of the gas or aerosol (see FIG. 2). It is important that sampling port 50 is connected to adaptor apparatus 40 rather than face mask portion 15 because if sampling port 50 were connected to face mask portion 15, respirator 10 would thereby become unsuitable for field use because open sampling port 50 could then admit noxious substances into face mask portion 15. It will be appreciated that adaptor apparatus 40 should be sized such that adaptor apparatus 40 is capable of being matingly received into filter receptacle 20 of respirator 10.

Face mask respirator 10 is tested to ensure that it fits the face of the wearer in a substantially sealtight relation so that the only path for air flow into the face mask is through filter assembly 30 and not around the edges of face mask portion 15 of respirator 10 where face mask portion 15 meets the face of the wearer (i.e., tightness of fit testing). Typically, tightness of fit testing is conducted in a gas chamber (not shown) containing an atmosphere having a predetermined quantity of an irritant test gas and/or particulate test aerosol having a test substance such as ammonia, vinyl bromomethane and ethanoic acid ether, dioctylpthalate, corn oil or the like (also not shown). In one type of tightness of fit testing, respirator 10 is determined to have a sufficiently tight fit on the face of the test subject or wearer if the test subject is unable to perceive the odor of the irritant gas and/or particulate aerosol. In another type of tightness of fit testing, the atmosphere inside face mask portion 15 is sampled and analyzed for the presence of the irritant gas and/or particulate aerosol. The sampling and analysis for the presence of the irritant test substance in the test gas and/or particulate aerosol may be assisted by a gas analysis unit 60 connected, such as by a flexible hose 65, to sampling port 50. Gas analysis unit 60 may be an analysis unit available from Air Techniques, Incorporated located in Baltimore, Md.

Figure 2:
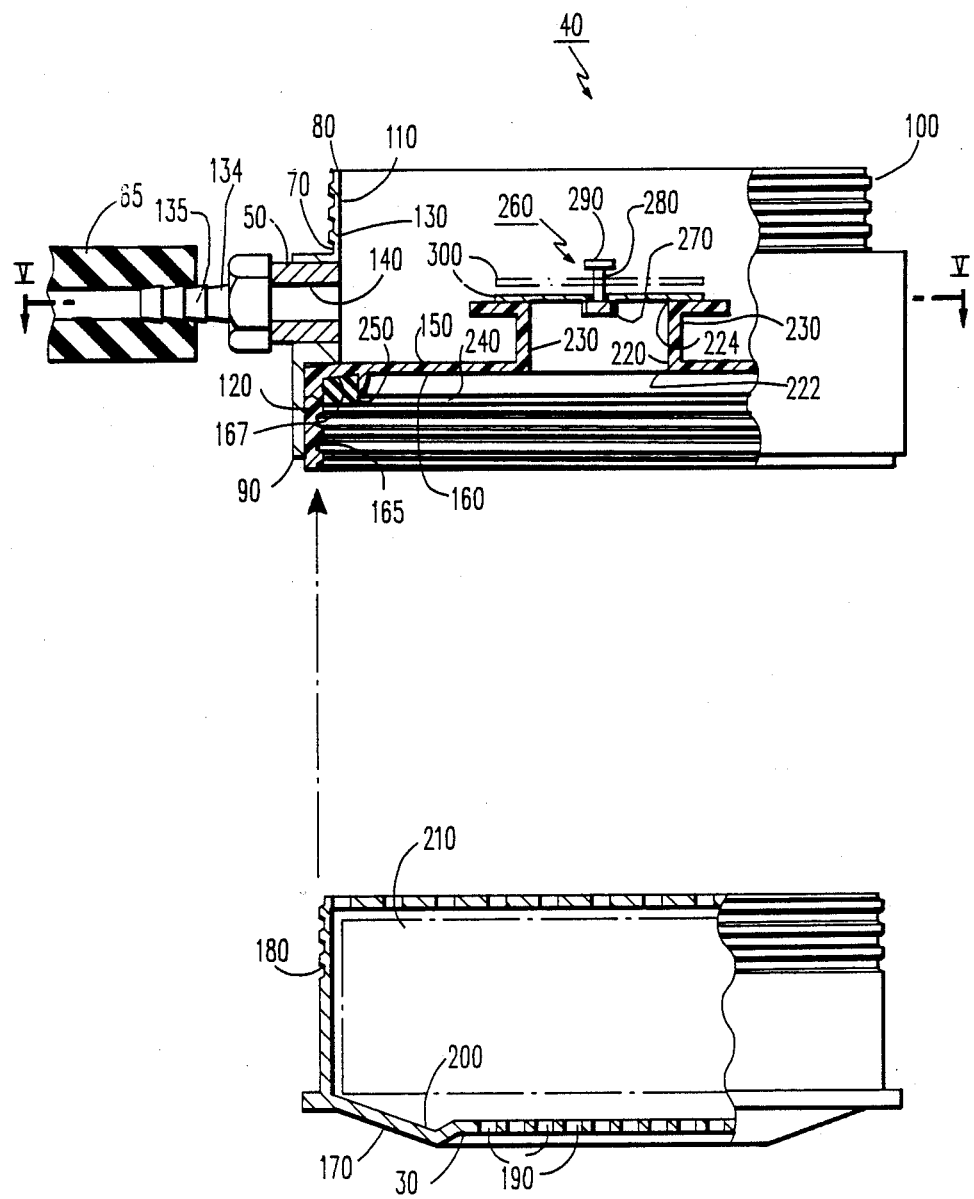
FIG. 2 is a view in partial vertical section showing the leak test adaptor apparatus having a filter assembly capable of being received therein.

Referring to FIG. 2, there is shown adaptor apparatus 40 comprising a generally cylindrical outer member 70, which may be aluminum, having a proximal end 80 and a distal end 90. Proximal end 80 is defined to be that end of outer member 70 which is disposed nearer the face of the wearer of respirator 10 when adaptor apparatus 40 is received in filter receptacle 20. Distal end 90 is defined to be that end of outer member 70 which is disposed farther away from the face of the wearer of respirator 10 when adaptor apparatus 40 is received in filter receptacle 20. proximal end 80 of outer member 70 has external threads 100 surrounding the outside surface thereof for threadably engaging filter receptacle 20 so that adaptor apparatus 40 is capable of being matingly threadably connected to filter receptacle 20. Formed through outer member 70 and extending from proximal end 80 to distal end 90 is a generally cylindrical longitudinal bore 110, which may be a step-wise bore, having a first end 120 terminating at distal end 90 and a second end 130 terminating at proximal end 80 of outer member 70. Laterally extending through outer member 70 and in communication with bore 110 is hollow sampling port 50, which may be generally circular in transverse cross section, for withdrawing a test gas and/or test aerosol from bore 110. Sampling port 50 includes a generally cylindrical hose connection portion 134 integrally attached thereto and outwardly extending therefrom for engaging the inside surface of hose 65. Hose connection portion 134 may also have a plurality of frusto-conical serrations 135 on the exterior thereof for intimately engaging the inside surface of hose 65 so that hose 65 can be removably connected to hose connection portion 134. Sealingly connected to sampling port 50 is flexible hose 65 which is capable of receiving the test gas and/or test aerosol therethrough from sampling port 50 for sampling the atmosphere in bore 110 for the presence of the test substance in the test gas and/or test aerosol. Hose 65 may in turn be connected to the gas analysis unit 60 (see FIG. 1) for analyzing the gas withdrawn from bore 110 so that the gas withdrawn from bore 110 may be detected, collected and/or analyzed for the presence of the test substance in the test gas and/or test aerosol.

Disposed in a cabinet sufficiently near the chamber is a forward light scattering photometer device (not shown) of a type such as available from Air Techniques Incorporated for measuring the quantity of test aerosol present in the atmosphere inside the chamber. Of course, the photometer device includes a light sensitive photometer sensor (also not shown), such as a photometer tube, for measuring light diffraction in the chamber. The photometer sensor is constructed and disposed in the photometer device such that direct light cannot reach the photometer sensor. The particulate test aerosol, such as dioctylphalate or corn oil, which is dispersed within the chamber forms an atmosphere comprising a plurality of suspended submicron beads. Direct light entering the chamber will be reflected or diffracted from the surfaces of the beads and redirected to the photometer sensor which is capable of measuring the amount of redirected light reaching the photometer sensor. The amount of particulate test aerosol which may have leaked inside face mask portion 15, as measured by gas analysis unit 60, is compared to the amount of particulate test aerosol present in the atmosphere inside the chamber, as measured by the photometer sensor, to determine the proportion of test aerosol which may have leaked into face mask portion 15 from the atmosphere within the chamber. Such a mathematical comparison quantitatively determines the extent to which face mask portion 15 sealingly fits the face of the test subject.

Again referring to FIG. 2, a generally cylindrical inner member 150 is matingly disposed in and attached to bore 110 near first end 120 of bore 110. Inner member 150 may be attached to bore 110 by any suitable means known in the art such as by threads, welding, press fit, adhesive or the like. Inner member 150 has a generally cylindrical filter recess 160 having an opening at one end for receiving filter assembly 30 therein. Filter recess 160 may have internal threads 165 for threadably receiving filter assembly 30 therein. As described hereinabove, proximal end 80 of outer member 70 has external threads 100 surrounding the outside surface thereof. Thus, adaptor apparatus 40 may have both external threads 100 surrounding the outside surface of proximal end 80 of outer member 70 and internal threads 165 belonging to recess 160. Moreover, filter recess 160 defines an annular seal recess 167 in inner member 150 for receiving a seal therein, as described in more detail hereinafter. As stated hereinabove, filter assembly 30 may be any suitable filter assembly readily available in the art such as a MSA filter assembly available from Mine Safety Appliances. By way of example, filter assembly 30 may comprise a generally cylindrical filter housing 170 having external threads 180 thereon for threadably engaging internal threads 165 of filter recess 160 and having a plurality of generally cylindrical gas intake hole 190 therethrough for passage of the test gas and/or test aerosol. Formed in housing 170 in communication with intake hole 190 is a generally cylindrical filter well 200 of larger diameter for matingly receiving a generally cylindrical particulate filter 210 therein having a predetermined composition. The composition of filter 210 may be any filter composition suitable for filtering-out the test substance from the test gas and/or test aerosol. It is important that filter 210 filter-out the test substance from the test gas so that the only possible flow path for the test substance into face mask portion 15 (see FIG. 1) is around the edges of face mask portion 15 where face mask portion 15 meets the face of the wearer. Thus, it will be appreciated that face mask portion 15 will not fit the face of the wearer in the desirable substantially seal-tight relation if the test gas and/or test aerosol is capable of entering face mask portion 15 around the edges thereof.

Still referring to FIG. 2, inner member 150 has a generally cylindrical channel 220 longitudinally extending therethrough for passage of the filtered test gas or aerosol flowing from filter 210. Channel 220 has a substantially circular inlet opening 222 at one end thereof in communication with filter recess 160 and a substantially circular outlet opening 224 at the other end thereof in communication with bore 110. Channel 220 defines a flow path for the filtered test gas and/or test aerosol flowing through channel 220 and out outlet opening 224. As shown in FIG. 2, inner member 150 thus includes a generally cylindrical valve seat post 230 integrally attached to inner member 150 and disposed coaxially therewith, which valve seat post 230 extends toward second end 130. It will be understood that when inner member 150 has valve seat post 230 integrally attached thereto, channel 220 will longitudinally extend through valve seat post 230.

Figure 3:
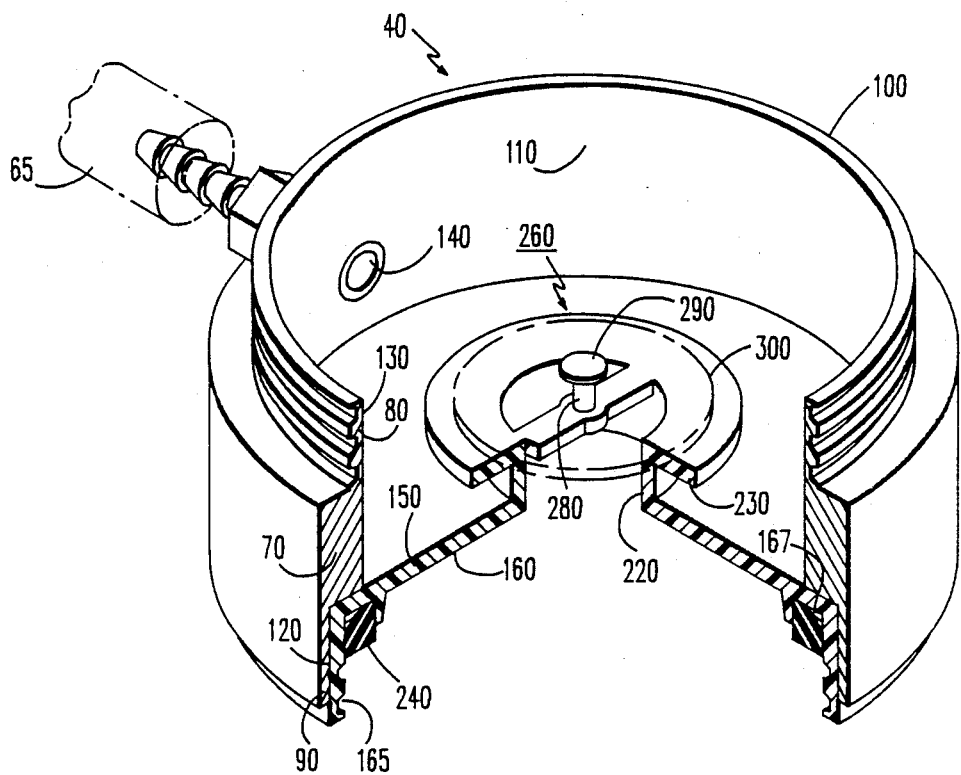
FIG. 3 is an orthogonal view in partial vertical section illustrating the leak test adaptor apparatus.

As best seen in FIGS. 2 and 3, interposed between filter assembly 30 and inner member 150 in seal recess 167 is a compressible generally annular filter seat at seal 240, which may be an elastomer gasket such as rubber. Seat seal 240 provides a tight seal between filter assembly 30 and inner member 150 when filter assembly 30 is threadably received in filter recess 160 and compressed against seat seal 240. As described in more detail immediately below, connected to inner member 150 in the flow path defined by channel 220 is means for regulating the flow of the gas through channel 220, which gas flow regulating means may be a pressure-responsive valve generally referred to as 260.

Figure 4:
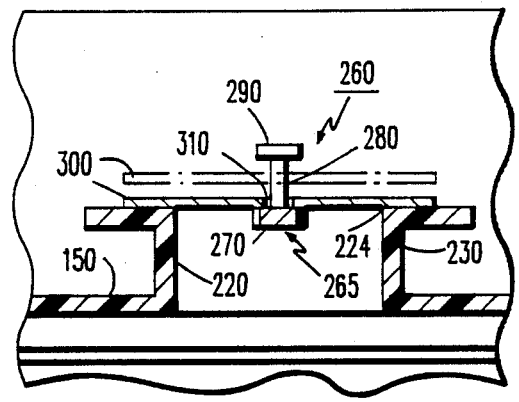
FIG. 4 is a vertical section of the leak test adaptor apparatus illustrating a first embodiment of a gas flow regulating means.
Figure 5:
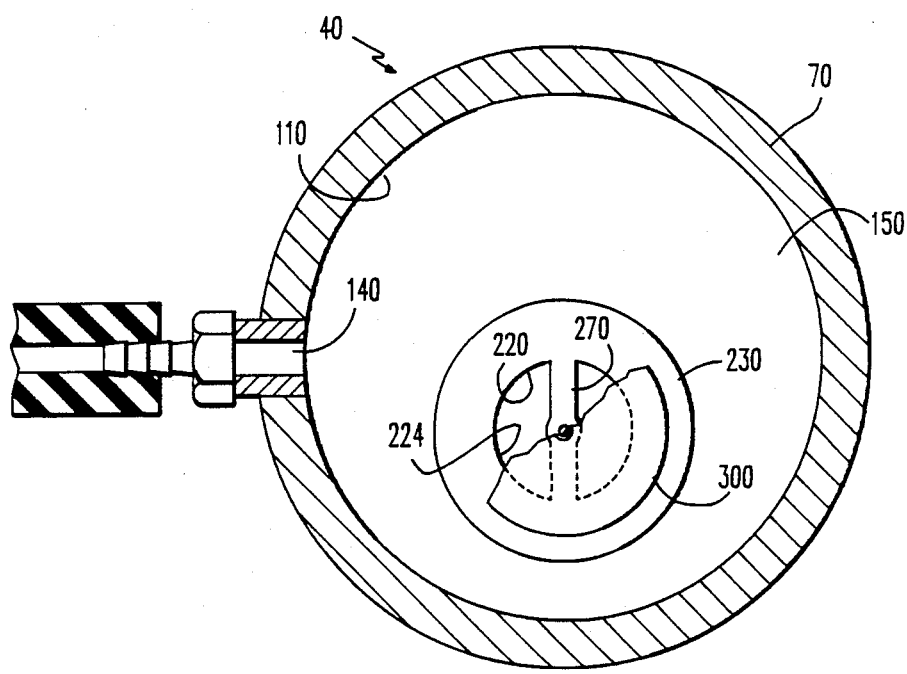
FIG. 5 is a view along section V—V of FIG. 2 illustrating the first embodiment of the gas flow regulating means.
Figure 5A:
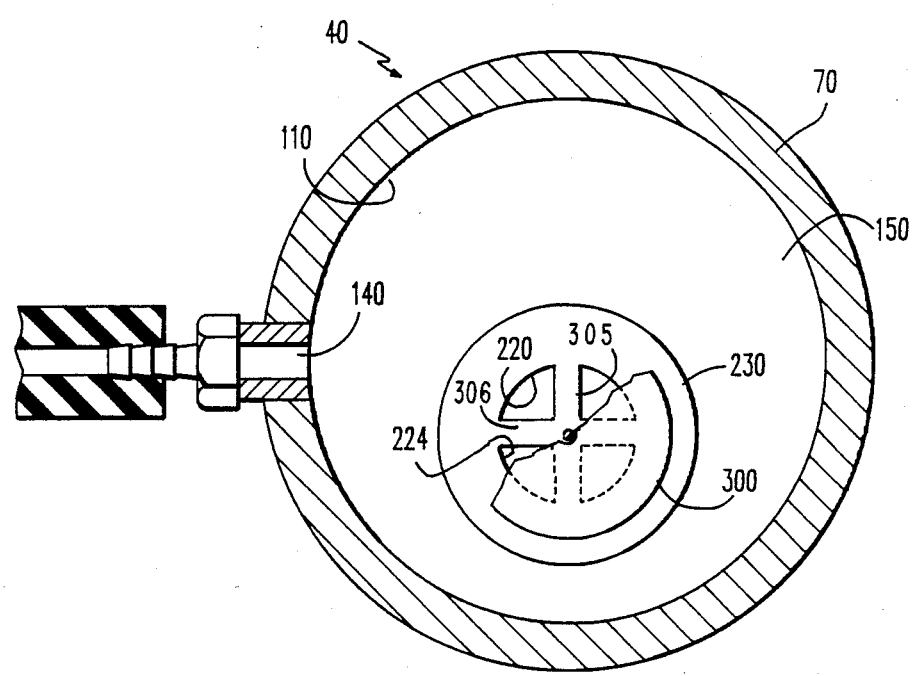
FIG. 5A illustrates two mutually perpendicular wires connected to an inner member.

As best seen in FIGS. 4 and 5, pressure responsive valve 260 comprises a valve seat, generally referred to as 265, integrally connected to inner member 150 or valve seat post 230 in the flow path of channel 220. For reasons described more fully hereinbelow, valve seat 265 may include a wire 270 integrally connected to inner member 150 and disposed in the flow path of the gas or aerosol flowing from outlet opening 224 of channel 220. It will be understood that wire 270 need not be metallic; rather, wire 270 may be formed from any convenient and suitable material readily available in the art such as plastic. Pressure responsive valve 260 further comprises a valve stem integrally connected to wire 270. The valve stem may be a generally cylindrical valve shaft 280 having one end thereof integrally connected to wire 270 such that wire 270 supports valve shaft 280. Valve stem or valve shaft 280 is disposed substantially perpendicular to and outwardly extends from wire 270 in the direction of second end 130 of bore 110. The other end of valve shaft 280 terminates in a bulbous portion 290 integrally formed with valve shaft 280, which bulbous may be generally cylindrical in transverse cross section. Pressure responsive valve 260 also includes a generally disk-shaped gate member 300, which may be a light-weight elastomer having a substantially thin transverse cross section, slidably connected to valve shaft 280. Gate member 300 is perpendicularly disposed on valve shaft 280 and horizontally interposed between wire 270 and bulbous portion 290. As shown in FIG. 4, when gate member 300 is disposed on valve 280, gate member 300 is not only substantially perpendicular to valve shaft 280 but also substantially parallel to wire 270. Of course, gate member 300 also includes an orifice 310 coaxially therethrough for slidably receiving valve stem or valve shaft 280 such that gate member 300 is capable of sliding along valve shaft 280. It will be appreciated that bulbous portion 290 has a diameter larger than the diameter of orifice 310 so that gate member 300 is prevented from sliding-off the end of valve shaft 280. As described more fully below, gate member 300 is capable of covering and uncovering outlet opening 224 of channel 220 for closing and opening, respectively, channel 220 by sliding along valve stem 280. Moreover, wire 270 is disposed horizontally across outlet opening 224 such that gate member 300 is prevented from folding and travelling into channel 220 when gate member 300 slides along valve stem or valve shaft 280 and into contact with wire 270. Moreover, the diameter of gate member 300 is larger than the diameter of outlet opening 224 for assisting in preventing gate member 300 from folding and travelling into channel 220 when gate member 300 slides along valve stem or valve shaft 280 and into contact with wire 270. If gate member 300 were to fold and travel into channel 220, gate member 300 would not be capable of suitably covering and closing outlet opening 224. Thus, wire 270 serves two functions. First, wire 270 supports valve shaft 280. Secondly, wire 270 prevents gate member 300 from folding and travelling into channel 220 so that outlet opening 224 can be suitably covered and closed. As stated hereinabove, gate member 300 may be a substantially thin lighter-weight elastomer. Therefore, the elastomeric gate member 300 is capable flexibly sealingly conforms to the contour of outlet opening 224 for sealing outlet opening 224 when gate member 300 covers outlet opening 224. Moreover, as described more fully below, the substantially thin and light-weight construction of gate member 300 allows gate member 300 to slide along valve shaft 280 under a relatively small differential gas or aerosol pressure which will act transversely across gate member 300. Alternatively, as shown in FIG. 5A, two mutually perpendicular wires 305 and 306 may be integrally connected to inner member 150 and disposed in the flow path of the gas or aerosol flowing from outlet opening 224 of channel 220.

Figure 6:
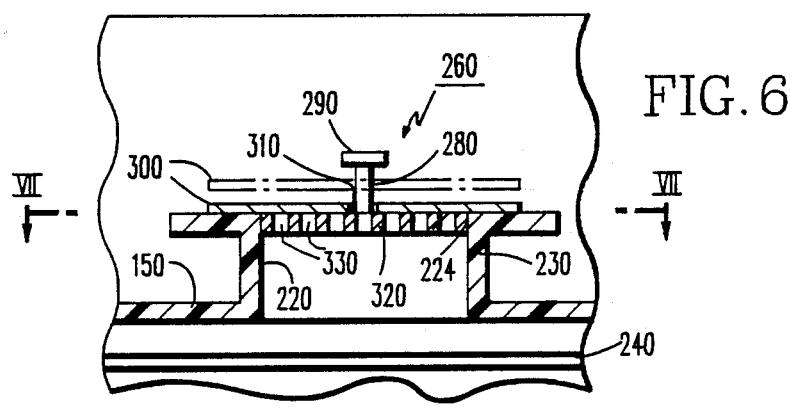
FIG. 6 is a vertical section of the leak test adaptor apparatus showing a second embodiment of the gas flow regulating means.
Figure 7:
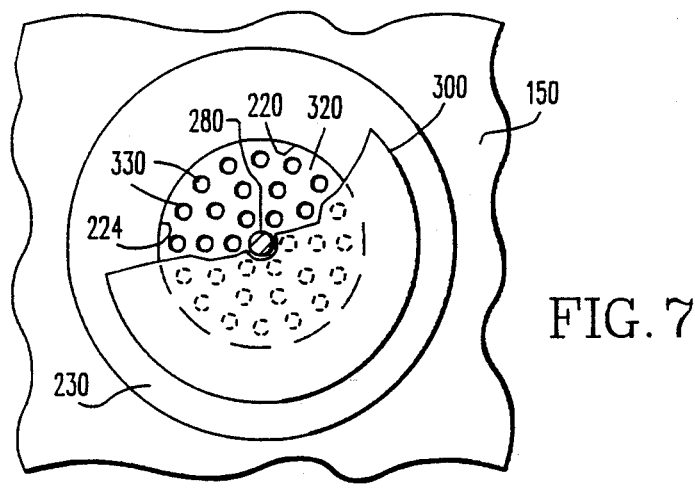
FIG. 7 is a view along section VII—VII of FIG. 6 showing the second embodiment of the gas flow regulating means.

Referring to FIGS. 6 and 7, there is shown an alternative embodiment of valve seat 265 comprising a valve seat cylinder 320 matingly disposed in channel 220 near outlet opening 224, valve seat cylinder 320 having a plurality of longitudinal conduits 330 therethrough for conducting the filtered test gas and/or test aerosol from channel 220 to bore 110. Valve seat cylinder 320 may be integrally attached within channel 220 by any suitable means such as by welding, press fit, adhesive or the like. Connected to valve seat cylinder 320 is valve shaft 280 substantially perpendicular thereto and outwardly extending therefrom towards second end 130 of bore 110. As stated above, valve shaft 280 has gate member 300 slidably connected thereto for covering and uncovering outlet opening 224. As in the case of wire 270, valve seat cylinder 320 serves two functions. First, valve seat cylinder 320 supports valve shaft 280. Secondly, valve seat cylinder 320 prevents gate member 300 from folding and travelling into channel 200 so that outlet opening 224 and conduits 330 can be suitably covered and closed.

Figure 8:
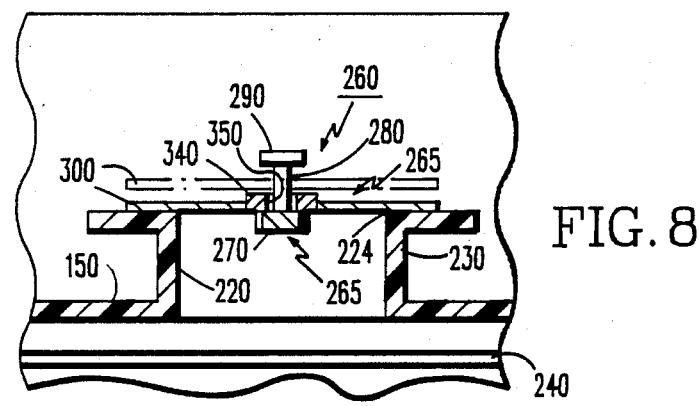
FIG. 8 is an illustration of the leak test adaptor apparatus showing a view in vertical section of an alternative embodiment of a gate member.

Referring to FIG. 8, an alternative embodiment of gate member 300 is shown having a generally cylindrical sleeve 340 surrounded by and integrally connected to gate member 300. Sleeve 340 extends coaxially through gate member 300. Sleeve 340 has a substantially smooth longitudinal orifice 350 therethrough for slidably receiving valve shaft 280 such that sleeve 340 having gate member 300 connected thereto is capable of smoothly sliding along valve shaft 280.

Figure 9:
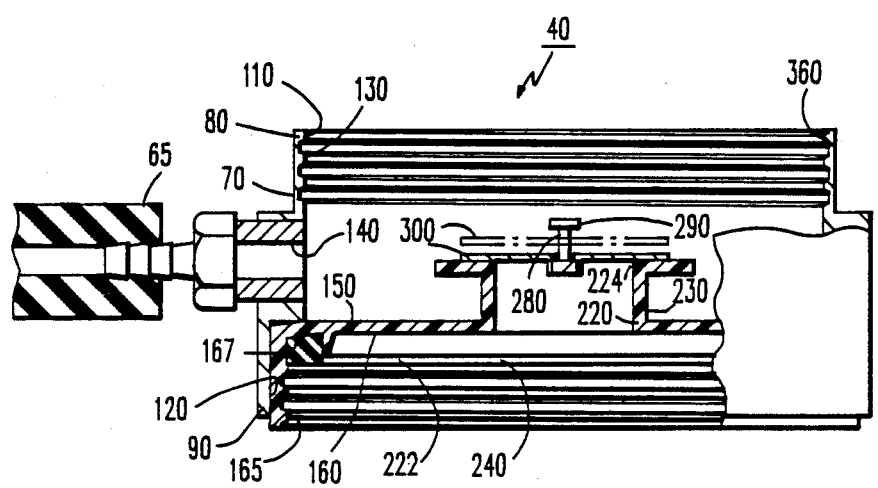
FIG. 9 is a view in vertical section of an alternative embodiment of the leak test adaptor apparatus illustrating the leak test adaptor apparatus having internal threads.

Referring to FIG. 9, there is illustrated an alternative embodiment of adaptor apparatus 40 having internal threads 360 for threadably engaging external threads (not shown) of filter receptacle 20 when filter receptacle 20 has external threads surrounding the exterior thereof. When internal threads 360 engage the external threads which may surround filter receptacle 20, adaptor apparatus 40 will thereby become threadably connected to filter receptacle 20.

Thus, it will be appreciated from the description hereinabove that adaptor apparatus 40 adapts the test subject's personal face mask respirator 10 for use in a tightness of fit test and thus avoids the use of a common face mask respirator which could expose the test subject to increased risk of contracting communicable and infectious diseases. It will also be appreciated that because sampling port 50 is connected to adaptor apparatus 40 rather than to face mask portion 15, respirator 10 remains suitable for field use.

According to the method of the invention, adaptor apparatus 40 is used to test respirator 10 for leaks and to test the tightness of fit of face mask portion 15 of respirator 10 when respirator 10 is worn on the face of a test subject. Of course, adaptor apparatus 40 should be sized to matingly fit filter receptacle 20. It is preferable that sampling part 50 of adaptor apparatus 40 be sealed to outer member 70 by a suitable sealant (not shown) such as silicon sealant, disposed around the point where sampling port 50 is inserted into outer member 70. Before conducting the tightness of fit test, gate member 300 should be inspected to ensure that it is in operable condition and free from breaks and through-cracks. Moreover, respirator 10, including face mask portion 15, should be visually inspected to ensure that it is in operable condition and free from breaks and through-cracks. Next, filter assembly 30, if previously inserted into filter receptacle 20, is threadably removed from filter receptacle 20. Adaptor apparatus 40 is then threadably connected to filter receptacle 20 by threadably engaging external threads 100 surrounding proximal end 80 of outer member 70 with the internal threads (not shown) of filter receptacle 20. Outer member 70 should be threaded into filter receptacle 20 in a manner which does not twist filter receptacle 20 where filter receptacle 20 is integrally attached to face mask portion 15 so that tearing of face mask portion 15 at that location is avoided. Filter assembly 30 is installed in adaptor apparatus 40 by threadably engaging external threads 180 of filter assembly 30 with internal threads 165 of filter recess 160.

The test subject preferably should be clean shaven at least in the area where the edges of face mask portion 15 meets the face of the test subject to ensure that face mask portion 15 meets the face of the test subject in a substantially seal-tight relation so that test gas and/or test aerosol does not enter into face mask portion 15 around the edges thereof. Moreover, the test subject should not be wearing contact lenses or glasses with conventional temple bars because the wearing of contact lenses for testing purposes is prohibited by United States Government regulations and temple bars may interfere with the ability of the respirator to fit the face of the test subject in a seal-tight relation. The test subject should properly don respirator 10, having adaptor apparatus 40 connected thereto, such that face mask portion 15 is suitably worn on the face of the test subject. The test subject then enters a test booth or gas chamber (not shown) for conducting the test if the test is conducted in a gas chamber or test booth. Hose 65 is then slidably sealingly fitted to sampling port 50 for sampling the atmosphere in bore 110. Next, test gas and/or test aerosol containing a predetermined amount of the test substance is introduced into the gas chamber. During the tightness of fit test, the test subject should perform physical exercises because such exercises simulate work conditions. For example, the test subject may be directed by the test operator to breathe normally, breathe deeply, talks and/or perform deep knee bends for approximately one minute each.

During the physical exercises, the test subject will inhale and exhale while wearing respirator 10 having adaptor apparatus 40 connected thereto. When the test subject inhales, a partial vacuum will be created near second end 130 of bore 110. It will be understood that the test gas and/or test aerosol present in the test booth or gas chamber thus will be drawn through gas intake hole 190 and through particulate filter 210 which will filter-out and remove the test substance from the test gas and/or test aerosol. The gas or aerosol, thus filtered, will travel from filter 210 and into channel 220 and thence out outlet opening 224. It will be appreciated that due to the vacuum near second end 130, the gas or aerosol pressure acting on the side of disk-shaped gate member 300 near second end 130 (i.e., upstream gas or aerosol pressure) is less than the gas or aerosol pressure acting on the side of gate member 300 near outlet opening 224 (i.e., downstream gas or aerosol pressure). This negative difference in gas or aerosol pressure acting transversely across gate member 300 will cause gate member 300 to levitate and to slide along valve shaft 280 toward bulbous portion 290 such that outlet opening 224 is uncovered and channel 220 is opened thereby. When the test subject exhales, the upstream gas or aerosol pressure acting on the side of disk-shaped gate member 300 near second end 130 is greater than the downstream gas or aerosol pressure acting on the side of gate member 300 near outlet opening 224. This positive difference in gas or aerosol pressure acting transversely across gate member 300 will cause gate member 300 to descend and to slide along valve shaft 280 toward outlet opening 224 such that outlet opening 224 is covered and channel 220 is closed hereby. When gate member 300 closes channel 220, the only path for exit of the gas or aerosol during expiration will be through exhalation port 35 and through sampling port 50. The gas flowing through sampling port 50 will flow into hose 65 which is connected to sampling port 50. As stated hereinabove, gate member 300 may be substantially thin and light-weight for easily sliding along valve shaft 280 when the difference in upstream and downstream pressures is relatively small. As stated hereinabove, the gas or aerosol in hose 65 is detected, collected and analyzed for the test substance using gas analysis unit 60 so that it can be determined whether respirator 10 has leaks and whether face mask portion 15 fits the face of the wearer in a substantially seal-tight relation.

As described hereinabove, when a test aerosol a light sensitive photometer sensor (not shown), such as a photometer tube, is disposed in a photometer device (not shown) for measuring the amount of light diffracted from the surfaces of submicron beads suspended in the test aerosol atmosphere within the chamber. Moreover, as described hereinabove, the amount of test aerosol which may have leaked inside face mask portion 15 is measured by gas analysis unit 60. An analysis is performed, using a mathematical relationship, which compares the amount of test aerosol present in the atmosphere within the chamber with the composition of the atmosphere inside face mask portion 15 as measured by gas analysis unit 60. The analysis and comparison quantitatively determines the extent to which face mask portion 15 sealingly fits the face of the test subject.

Following the physical exercises, the test subject may be directed by the test operator to disconnect hose 65 from sampling port 50, exit the test booth or gas chamber and remove respirator 10. During the tightness of fit test described hereinabove, the comfort of the test subject may also be noted by the test operator and recorded for determining whether or not respirator 10 properly fit the face of the wearer. Moreover, gas analysis unit 60 will have collected the appropriate test data during the test; consequently, this test data will be reviewed for determining the tightness of fit of respirator 10.

Although the invention is illustrated and described herein in several embodiments, it is not intended that the invention as illustrated and described be limited to the details shown, since various modifications may be obtained with respect to the invention without departing from the spirit of the invention or the scope or equivalents thereof.

Therefore, what is provided is a leak test adaptor apparatus having pressure-responsive gas flow regulating means and a gas sampling port for facilitating leak testing face mask respirators.

What I claim is:

1. An apparatus for sampling a gas or a particulate aerosol, the apparatus connected to a face mask having an exhaust port, comprising:
   (a) an outer member having a bore therethrough, the bore having a first end and a second end, said outer member connected to the face mask and spaced-apart from the exhaust port;
   (b) an inner member disposed in the bore of said outer member, said inner member having a channel therethrough for passage of the gas or aerosol through the channel;
   (c) means connected to said inner member for regulating the flow of the gas or aerosol through the channel; and
   (d) a sampling port formed through said outer member, said sampling port in communication with the bore for sampling the gas or aerosol in the bore, said sampling port having an obstruction-free passageway therethrough for passage of the gas or aerosol.

2. The apparatus according to claim 1, wherein said gas flow regulating means is a pressure-responsive valve for opening the channel when the gas or aerosol pressure near the first end of the bore is greater than the gas or aerosol pressure near the second end of the bore.

3. The apparatus according to claim 1, wherein said gas flow regulating means is a pressure-responsive valve for closing the channel when the gas or aerosol pressure near the second end of the bore is greater than the gas or aerosol pressure near the first end of the bore.

4. An apparatus for leak-testing a face mask having an exhaust port and a filter receptacle attached thereto, the apparatus connected to the face mask, comprising:
   (a) an outer member having a proximal end and a distal end, said outer member having a bore therethrough extending from the proximal end to the distal end of said outer member, the bore having a first end near the distal end and a second end near the proximal end of said outer member, said outer member connected to the face mask and spaced-apart from the exhaust port;
   (b) an inner member matingly disposed in the bore near the first end of the bore, said inner member having a recess for matingly sealingly receiving a filter therein, said inner member having a channel therethrough having an inlet opening in communication with the recess and a outlet opening in communication with the bore, the channel defining a flow path for a gas or an aerosol flowing through the channel and out the outlet opening of the channel;
   (c) means connected to said inner member for regulating the flow of the gas or aerosol through the channel; and
   (d) a sampling port formed through said outer member, said sampling port in communication with the bore for sampling the gas or aerosol in the bore, said sampling port having an obstruction-free passageway therethrough for passage of the gas or aerosol.

5. The apparatus according to claim 4, wherein said gas flow regulating means is a pressure-responsive valve for closing the channel when the gas or aerosol near the inlet opening of the channel is greater than the gas or aerosol pressure near the outlet opening of the channel.

6. The apparatus according to claim 5, wherein said pressure-responsive valve opens the channel when the gas or aerosol pressure near the inlet opening of the channel is greater than the gas or aerosol pressure near the outlet opening of the channel.

7. The apparatus according to claim 6, wherein said pressure-responsive valve further comprises a valve seat connected to said inner member, said valve seat disposed in the flow path of the gas or aerosol flowing from the outlet opening of the channel.

8. The apparatus according to claim 7, wherein said valve seat further comprises at least two mutually perpendicular wires connected to said inner member and disposed in the flow path of the gas or aerosol flowing from the outlet opening of the channel.

9. The apparatus according to claim 8, wherein said pressure-responsive valve further comprises a valve stem integrally connected to at least one of said wires.

10. The apparatus according to claim 9, wherein said valve stem is a valve shaft having one end thereof integrally connected to at least one of said wires and outwardly extending therefrom in the direction of the second end of the bore, said shaft having a bulbous portion near the other end thereof.

11. The apparatus according to claim 10, wherein said pressure-responsive valve further comprises a gate member slidably connected to said valve stem for sliding along said valve stem, said gate member interposed between said valve seat and the bulbous portion of said valve stem, said gate member capable of covering and uncovering the outlet opening of the channel for closing and opening the channel as said gate member slides along said valve stem.

12. The apparatus according to claim 11, wherein said gate member is light-weight.

13. The apparatus according to claim 12, wherein said gate member is a light-weight elastomer.

14. The apparatus according to claim 4, wherein said outer member further comprises means integrally connected to said outer member for matingly connecting said outer member to the filter receptacle of the face mask.

15. The apparatus according to claim 4, wherein the recess of said inner member has one end in communication with the inlet opening of the channel and has another end for matingly sealingly receiving the filter therein.

16. An apparatus for leak-testing a face mask respirator when worn on the face of a wearer, the face mask respirator having an exhaust port and a filter receptacle connected thereto, comprising:
 (a) a generally cylindrical outer member having a proximal end and a distal end, said outer member having a generally cylindrical bore therethrough extending from the proximal end to the distal end of said outer member, the bore having a first end terminating at the distal end of said outer member and a second end terminating at the proximal end of said outer member, said outer member connected to the face mask respirator and spaced-apart from the exhaust port;
 (b) a generally cylindrical inner member matingly disposed in the bore near the first end of the bore, said inner member having a generally cylindrical filter recess in one end thereof for matingly sealingly receiving a filter assembly therein capable of filtering a gas or aerosol therethrough, said inner member having a generally cylindrical channel for flow of the gas or aerosol therethrough, the channel having a substantially circular inlet opening at one end thereof in communication with the recess and a substantially circular outlet opening at the other end thereof in communication with the bore, the channel defining a flow path for the gas or aerosol flowing through the channel and out the outlet opening of the channel;
 (c) means connected to said inner member for regulating the flow of the gas or aerosol through the channel; and
 (d) a hollow generally cylindrical sampling port laterally extending through said outer member, said sampling port in communication with the bore for withdrawing the gas or aerosol from the bore, said sampling port having an obstruction-free passageway therethrough for passage of the gas or aerosol.

17. The apparatus according to claim 16, wherein said gas flow regulating means is a pressure-responsive valve for closing the channel when the upstream gas or aerosol pressure is greater than the downstream gas or aerosol pressure.

18. The apparatus according to claim 17, wherein said pressure responsive valve opens the channel when the upstream gas or aerosol pressure is greater than the downstream gas or aerosol pressure.

19. The apparatus according to claim 18, wherein said pressure-responsive valve further comprises:
 (a) at least two mutually perpendicular wires integrally connected to said inner member near the outlet opening of the channel, said wires disposed in the flow path of the gas or aerosol flowing through the channel and out the outlet opening of the channel;
 (b) a generally cylindrical valve shaft having one end thereof integrally connected to at least one of said wires and outwardly extending therefrom in the direction of the second end of the bore, said shaft having a bulbous portion at the other end thereof;
 (c) a generally disk-shaped gate member slidably connected to said valve shaft and disposed perpendicularly thereto for sliding along said valve shaft, said gate member interposed between said wires and the bulbous portion of said valve shaft, said gate member capable of covering the outlet opening of the channel when the upstream gas or aerosol pressure is greater than the downstream gas or aerosol pressure, whereby the channel closes as said gate member slides along said valve shaft and covers the outlet opening and opens as said gate member slides along said valve shaft and uncovers the outlet opening.

20. The apparatus according to claim 19, wherein said gate member is an elastomer for flexibly sealingly conforming said gate member to the contour of the outlet opening of the channel for sealing the outlet opening when said gate member covers the outlet opening.

21. The apparatus according to claim 20, further comprising external threads surrounding the outer member for threadably connecting said outer member to the filter receptacle of the face mask.

22. The apparatus according to claim 20, further comprising internal threads surrounding the bore of the outer member near the second end of the bore for threadably connecting said outer member to the filter receptacle of the face mask.

23. The apparatus according to claim 22, further comprising threads surrounding the filter recess for threadably connecting said inner member to the filter assembly.

* * * * *